Feb. 5, 1946.   G. S. NALLE, JR   2,394,093
TOP
Filed Feb. 10, 1944
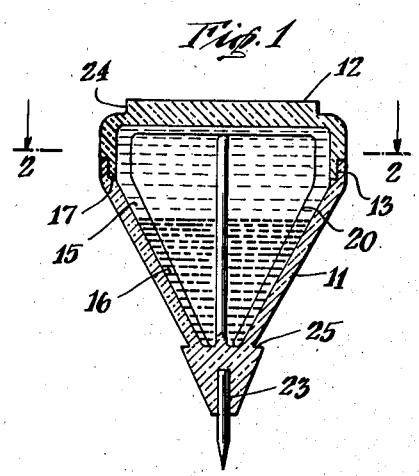
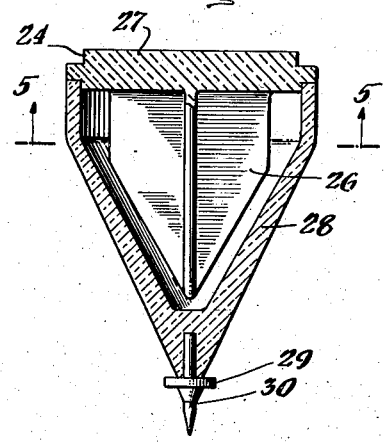
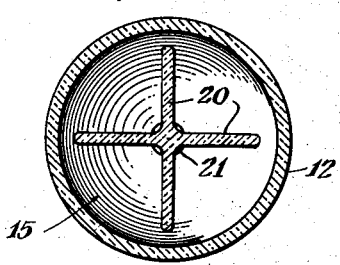
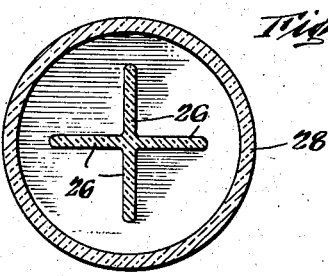
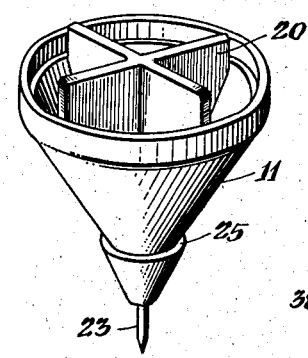
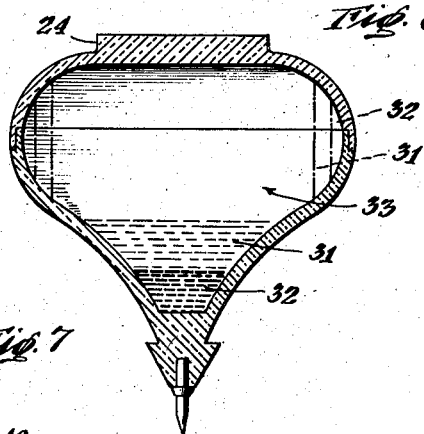
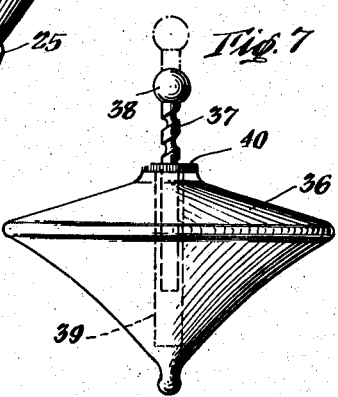
INVENTOR.
George S. Nalle, Jr.
BY
ATTORNEY Patented Feb. 5, 1946

2,394,093

UNITED STATES PATENT OFFICE 2,394,093

TOP

George S. Nalle, Jr., Austin, Tex.

Application February 10, 1944, Serial No. 521,759

5 Claims. (Cl. 46—65)

This invention relates to tops such as toy tops, but can also be applied to tops used for educational purposes, more specifically for teaching colors.

One object of the invention is to provide a top containing a fluid that changes the color of, at least, a portion of the top when the top spins. Another object is to provide a top containing liquids of different color and different density with a transparent portion through which the liquids are visible from outside the top. In one embodiment of the invention the liquids mix when the top spins so that two colors visible in different zones when the top is at rest are mixed to form a third color when the top spins.

In another embodiment of the invention the liquids of different density cause changes in color at different zones of the top by the action of centrifugal force.

While the primary object of the invention is to provide a top for purposes of amusement, the same principle can be used in more elaborate modifications for teaching the blending of colors, such as in physics classes.

One feature of the invention relates to means for causing the liquid to rotate when spinning motion is initially given to the top. Without this it is not practical to enclose any substantial mass of liquid within the top because a mass of liquid that is not rotating with the body of the top quickly robs the top of its spinning inertia.

Other objects, features and advantages of the invention will appear or be pointed out as the specification proceeds.

In the drawing, forming a part hereof, in which like reference characters indicate corresponding parts in all views, Fig. 1 is a sectional view through a top embodying this invention;

Fig. 2 is a horizontal sectional view taken on the line 2—2 of Fig. 1;

Fig. 3 is a perspective view of the top shown in Figs. 1 and 2 with the liquid and upper portion of the top removed;

Fig. 4 is a sectional view, similar to Fig. 1, but showing a modified form of the invention;

Fig. 5 is a sectional view taken on the line 5—5 of Fig. 4;

Fig. 6 is a sectional view through a second modified form of the invention; and

Fig. 7 is an elevation, on a reduced scale, showing another modified form of the invention.

Figure 1 shows a top having an entirely transparent body including a lower portion 11 and an upper portion 12 connected together by a lap joint 13. The joint is preferably made with transparent cement and may be threaded if desired.

Within the top body there is a chamber 15 enclosing two liquids 16 and 17. These liquids are of different color and are immiscible in one another. Liquid 16 is of greater density than the liquid 17 and therefore settles to the bottom of the chamber. The term immiscible as used in this description and in the claims is not to be understood in a strictly chemical sense, since few liquids are completely immiscible in one another. The term is used herein in a broader sense to indicate that there are separate masses of the two liquids present in the top.

The chamber 15 may be completely filled with liquid if the top is constructed so that the upper portion or sides can yield sufficiently to provide for expansion of the liquid when warm, but the provision of a small air space in the upper end of the chamber 15 has the advantage of reducing the stress on the joint 13 when the liquid in the top expands with increase in temperature.

The mass of the liquid in the chamber 15 is quite substantial as compared with the mass of the body of the top, and it is therefore important to impart rotation to the liquid at the same time that rotary motion is imparted to the top. Otherwise the top will spin for only a very short time, the non-rotating liquid within the chamber acting as a brake.

Vanes 20 extending from a central hub 21 are provided to give rotary movement to the liquid in the chamber 15 when the spinning inertia is first imparted to the top. These vanes 20 and the hub 21 may be cast as an integral part of the lower portion 11 of the top body, or otherwise secured to the body of the top. In Figures 1 to 3 the vanes 20 are shown extending almost to the top of the chamber 15 and almost to the side walls of the chamber. A wide latitude of proportions is satisfactory, however, both in the radial and vertical extent of the vanes 20, and in the number of vanes employed. Choices are influenced largely by the process to be used in the manufacture of the top, and by considerations of appearance.

The point of the top can be made of the same material as the lower portion 11, but most transparent materials do not make suitable points for a top to spin on, and the construction shown in Figures 1 to 3 has a metal point 23 molded into or otherwise secured to the lower end of the top.

This invention may be used with various types of tops, such as flattened disc-type tops which spin on a fixed center, or conical shaped tops such as illustrated in the drawing. Tops of the type illustrated are spun with a string or spiral push-rod and the preferred embodiments of the invention are provided with a shoulder 24 at the upper end for holding one end of the string, and another shoulder 25 a short distance up from the point for preventing the wrapped string from slipping off the lower end of the top.

Figure 4 shows a modified form of the invention in which the upper portion of the top body is merely a cover. This construction also differs from that of Figures 1 to 3 in that vanes 26 are connected with the cover 27 instead of with the lower portion of the top. For some methods of manufacture the construction shown in Figure 4 is preferable. The lower portion 28 of the top shown in Figure 4 is considerably simpler to mold or cast because it does not have any shoulder corresponding to the shoulder 25 of Figure 1. The string is prevented from slipping off the top of Figure 4 by a washer 29 extending some distance beyond the conical surface of the top body and held in place by a point 30 which is secured in the lower end of the top.

Figure 6 shows a modification of the invention in which two liquids 31 and 32 are enclosed in a chamber 33 which has its maximum diameter at a region intermediate the upper and lower ends of the top body. In this form of the invention the liquids 31 and 32 are thrown out against the sides of the chamber 33 by centrifugal force to assume the locations indicated by dotted lines. There being comparatively little liquid in the chamber 33 compared to the size and mass of the top, it is not essential to employ vanes for imparting rotation to the liquid. The mass of the top is sufficient so that some of the inertia of the spinning top can be imparted to the liquid without causing the top to stop and without unduly shortening the period that the top will spin.

Where vanes are employed in the top, experience shows that the liquids are thoroughly mixed as the top spins, and the two different colors of the liquids are blended into a third color. The liquids within the top are, in effect, beaten into an emulsion by the rotating vanes. When there are no vanes, as in Figure 6, and there is sufficient difference in the density of the liquids 31 and 32, they stratify and form independent zones of color which creep back toward the bottom of the top as the speed of rotation decreases.

Any transparent material of suitable strength may be used for this invention. It is not necessary that the body of the top be constructed of the same material throughout, or that all portions of the top be transparent. The term "transparent" is used to mean at least partially transparent; that is, transparent over a portion of the extent of the top body so that the color or colors of the liquids in the top can be observed. For tops that are thrown down, as is the customary method of spinning conical tops, it is necessary to use a material having sufficient resistance to shock. Ethyl cellulose or cellulose acetate are suitable.

Figure 7 shows another modified form of the invention in which motion is imparted to the transparent top 36 by plunger 37 that has a spiral bearing surface threading into a ratchet bushing 40 connected to the body of the top in such a way as to impart rotation to the top when the plunger 37 is pushed down. The plunger 37 can be pulled up by its handle 38 without interfering with the motion of the top and then pushed down again to increase the speed of rotation, in a manner well understood in the art.

The top 36 has a transparent hollow body for holding fluid and a sleeve 39 extending axially through the fluid chamber of the body for housing the plunger 37.

What is claimed is:

1. A hollow top with a transparent wall that encloses a chamber, said chamber extending around the axis of rotation of the top and increasing in diameter from its lower end upward to a region of maximum diameter, two liquids within the chamber, said liquids being of different color and different density and immiscible with one another so that they form zones comprising annular rings of different color when the top spins, the upper portion of the top being transparent so that said rings of different color are visible from above when the top is spinning.

2. A hollow transparent top having a side wall enclosing a chamber two liquids of different color and different density within the chamber, said chamber extending entirely around the axis of rotation of the top, and said side wall having an inside surface symmetrical about the axis of rotation of the top and sloping throughout its length toward an intermediate horizontal zone at which the chamber is of larger diameter than at other regions above and below said zone.

3. A spinning top with a transparent wall that encloses a chamber; said chamber extending around the axis of rotation of the top and being of increasing diameter from its lower end upward to a region of maximum diameter, a liquid within the chamber and of substantially less volume than the volume of said chamber, and means for imparting rotation to both the top and the liquid, said means comprising an axially-extending sleeve that passes through the chamber and opens through the upper end of the top, a threaded plunger that extends through the open upper end and into the sleeve, a handle at the top of the plunger for moving the plunger up and down, and ratchet means in the body of the top and through which the plunger passes for imparting rotary movement to the top upon movement of the plunger in one direction.

4. A hollow top comprising a transparent body that encloses a chamber, a stem extending upward from the body along the axis of rotation of the top for imparting rotary movement to the body, a liquid enclosed within the chamber, a second liquid of different color and different density from the first liquid and also enclosed within said chamber with the first liquid, said liquids being immiscible in one another and having a combined volume that is less than the volume of the chamber; the inside wall of said chamber being substantially symmetrical about the axis of rotation of the top and diverging from both its upper and lower ends toward an intermediate zone at which the chamber is of larger diameter than at other regions above and below said zone.

5. A hollow top comprising a transparent body that encloses a chamber, an axially-extending sleeve that passes through the chamber and opens through the upper end of the top, a threaded stem that extends upward from the body along the axis of rotation of the top for imparting rotary movement to the body, a handle at the top of the stem for moving the stem up and down, and ratchet means in the body of the top and through which the threaded stem passes for imparting rotary movement to the top upon downward movement of the stem, a liquid enclosed within the chamber, a second liquid of different color and different density from the first liquid and also enclosed within said chamber, said liquids being immiscible in one another and having a combined volume that is less than the volume of the chamber, the inside wall of said chamber being substantially symmetrical about the axis of rotation of the top and diverging from both its upper and lower ends toward an intermediate zone at which the chamber is of larger diameter than at other regions above and below said zone.

GEORGE S. NALLE, JR.